UNITED STATES PATENT OFFICE.

OTTO W. MEYSENBURG, OF ST. LOUIS, MISSOURI, ASSIGNOR OF ONE-HALF HIS RIGHT TO THEODORE A. MEYSENBURG, OF SAME PLACE.

IMPROVEMENT IN MODE OF WELDING BESSEMER STEEL RAILS.

Specification forming part of Letters Patent No. 188,396, dated March 13, 1877; application filed December 20, 1876.

*To all whom it may concern:*

Be it known that I, OTTO W. MEYSENBURG, a resident of St. Louis, Missouri, have invented a new and useful Mode of Welding Bessemer Steel, of which the following is a full, clear, and exact description.

By means of the present improvement a flux is dispensed with, and a perfect weld produced by means of heat and compression only.

The invention is especially useful in providing a ready means for utilizing the crop ends of Bessemer steel rails. Such ends, which hitherto have had but little value, can, by my process, be welded economically and made into fish-bars and many other articles requiring strength and tenacity. My improvement is equally valuable in connection with any Bessemer steel that has been subjected to a treatment substantially similar to that necessary to produce Bessemer steel rails.

The procedure is as follows: I form a pile of Bessemer steel rails or ends of rails, two, three, or more, and place it in an ordinary heating-furnace, where it is slowly and evenly heated to what is termed a light or soft white heat, or what some heaters may term a slightly yellowish white heat, and which, according to Hartmann's table, (see *Handbuch der Eisenhütten gewerbskunde*, Carl Hartmann, 1865, p. 409,) is about 1200° centigrade. At this time the cinder is running and boiling freely throughout the pile. While at this heat the pile is withdrawn from the furnace and immediately passed through the rolls, and the weld is formed by the consequent compression. Care must be taken, on the one hand, to heat the pile to the degree named to effect the desired union, and, on the other hand, not to exceed it, and especially not to carry it to a white heat, (at which iron is welded,) or the mass will disintegrate in the rolling and become worthless.

For a better understanding of the degree of heat essential to the present process, I wish to say that I recognize the distinction, made by Hartmann in the table referred to, between a dark orange heat and soft white or yellowish white heat described, and between the latter and a white heat, and still more between a soft white or yellowish white and a strong white heat.

A perfect weld is not only made by this process, but the product is peculiarly valuable in possessing the strength and tempering quality of steel, in combination with the toughness of wrought-iron, and from it such tools as taps, drills, and cold-chisels can be made.

In carrying out the invention I have also found it highly desirable that the rolls have such shape as to close the pile of heated steel on the first pass, as any portion of the pile not quickly compressed is apt to chill and prevent the desired weld.

I am aware that piles of iron rails are, without using a flux, welded by heating them to a white heat, and then compressing them; but such a degree of heat, for the reason above named, would entirely preclude the welding of Bessemer metal.

What I claim is—

The method herein described of welding Bessemer steel rails—that is to say, forming a pile of several of such rails, pieces of rail, or crop ends, without the admixture therewith of any other substance; heating said pile slowly and uniformly to the temperature, substantially, of 1200° centigrade; and then passing the same through or between compressing-rollers adapted to the shape of the pile, thereby welding the pile into a homogeneous mass.

O. W. MEYSENBURG.

Witnesses:
SAML. S. BOYD,
CHAS. D. MOODY.